United States Patent
Riabkov et al.

(10) Patent No.: US 9,172,500 B2
(45) Date of Patent: Oct. 27, 2015

(54) SIGNAL DEMODULATION METHOD AND DEVICE

(71) Applicant: Huawei Technologies Co., Ltd., Shenzhen, Guangdong (CN)

(72) Inventors: Dmitri Riabkov, Moscow (RU); Xi Yan, Shenzhen (CN); Guangjian Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/516,126

(22) Filed: Oct. 16, 2014

(65) Prior Publication Data

US 2015/0098531 A1 Apr. 9, 2015

Related U.S. Application Data

(63) Continuation of application No. PCT/CN2013/073073, filed on Mar. 22, 2013.

(30) Foreign Application Priority Data

Apr. 17, 2012 (CN) .......................... 2012 1 0112268

(51) Int. Cl.
*H04L 27/06* (2006.01)
*H04L 1/00* (2006.01)
(Continued)

(52) U.S. Cl.
CPC ............ *H04L 1/0054* (2013.01); *H04L 25/067* (2013.01); *H04L 27/38* (2013.01)

(58) Field of Classification Search
CPC .................................................... H04L 1/0054
USPC ......................................................... 375/341
See application file for complete search history.

(56) References Cited

U.S. PATENT DOCUMENTS

| 5,335,250 A * | 8/1994 | Dent et al. ..................... 375/224 |
| 6,560,294 B1 * | 5/2003 | Gatherer ......................... 375/261 |

(Continued)

FOREIGN PATENT DOCUMENTS

| CA | 2625111 A1 | 4/2007 |
| CN | 1265547 A | 9/2000 |

(Continued)

OTHER PUBLICATIONS

Perez-Calderon et al., "Rotated constellation demapper for DVB-T2," Electronic Letters, vol. 47, No. 1, pp. 31-32 , Institution of Engineering and Technology, London, England (Jan. 6, 2011).

(Continued)

*Primary Examiner* — Santiago Garcia
(74) *Attorney, Agent, or Firm* — Leyding, Voit & Mayer, Ltd.

(57) ABSTRACT

The present invention provides a signal demodulation method and device. The method includes: obtaining a symbol probability parameter, where the symbol probability parameter comprises: an amplitude $r_y$ and a phase angle $\phi_y$ of a receive signal, an amplitude $r_{x_j}$ and a phase angle $\phi_{x_j}$ of each constellation point $x_j$ in a decision constellation point set, and a standard deviation $\sigma_n$ of Gaussian noise and a standard deviation $\pi_\theta$ of phase noise; calculating, according to the symbol probability parameter, a symbol probability that a transmit signal is each constellation point $x_j$ in the decision constellation point set; and performing demodulation according to the symbol probability, and outputting demodulation information. The present invention improves an anti-phase-noise capability.

11 Claims, 9 Drawing Sheets

(51) Int. Cl.
*H04L 27/38* (2006.01)
*H04L 25/06* (2006.01)

(56) References Cited

U.S. PATENT DOCUMENTS

| | | | |
|---|---|---|---|
| 2003/0014714 A1* | 1/2003 | Yamada | 714/786 |
| 2003/0185319 A1* | 10/2003 | Kolze | 375/347 |
| 2006/0083324 A1* | 4/2006 | DesJardins et al. | 375/260 |
| 2006/0171418 A1* | 8/2006 | Casini et al. | 370/474 |
| 2008/0056305 A1* | 3/2008 | Medvedev et al. | 370/491 |
| 2009/0092208 A1* | 4/2009 | Montekyo et al. | 375/346 |
| 2009/0322331 A1* | 12/2009 | Buracas | 324/309 |
| 2010/0054322 A1* | 3/2010 | Hui et al. | 375/232 |
| 2010/0281089 A1* | 11/2010 | Vigoda et al. | 708/274 |
| 2012/0212369 A1* | 8/2012 | Revol et al. | 342/357.35 |
| 2014/0192394 A1* | 7/2014 | Sun et al. | 359/289 |

FOREIGN PATENT DOCUMENTS

| | | |
|---|---|---|
| CN | 101014033 A | 8/2007 |
| CN | 101136893 A | 3/2008 |
| CN | 101176325 A | 5/2008 |
| KR | 100932777 B1 | 12/2009 |

OTHER PUBLICATIONS

Minowa et al., "Phase-Noise Effects on Turbo Trellis-Coded Modulation Over M-ary Coherent Channels," IEEE Transactions on Communications, vol. 52, No. 8, pp. 1333-1343, Institute of Electrical and Electronics Engineers, New York, New York (Aug. 2004).

Li et al., "Design of Rotated QAM Mapper/Demapper for the DVB-T2 Standard," IEEE 2009 Workshop on Signal Processing Systems, pp. 018-023, Institute of Electrical and Electronics Engineers, New York, New York (Oct. 7-9, 2009).

Ahmed et al., "Multiuser Detection in the Presence of Strong Phase Noise for DVB-RCS Systems," IEEE 2011 Wireless Communications and Networking Conference, pp. 1499-1504, Institute of Electrical and Electronics Engineers, New York, New York (Mar. 28-31, 2011).

* cited by examiner

SIGNAL DEMODULATION METHOD AND DEVICE

CROSS-REFERENCE TO RELATED APPLICATION

This application is a continuation of International Patent Application No. PCT/CN2013/073073, filed on Mar. 22, 2013, which claims priority to Chinese Patent Application No. 201210112268.5, filed on Apr. 17, 2012, both of which are hereby incorporated by reference in their entireties.

TECHNICAL FIELD

The present invention relates to communications technologies, and in particular, to a signal demodulation method and device.

BACKGROUND

In order to meet the development requirements of multimedia communication services, high order modulation such as multiple quadrature amplitude modulation (Multiple Quadrature Amplitude Modulation, MQAM) is widely used in a modern wireless communication system, so as to provide a higher information transmission rate in a limited frequency band. However, the high order modulation is very sensitive to factors such as phase noise and Gaussian noise in a signal transmission process, the noise enables a receive signal of a receiving end to randomly move or rotate when compared with a correct corresponding modulation constellation point, so that a decision of the receiving end on a transmit signal corresponding to the receive signal is affected, and a wrong modulation constellation point and a corresponding data bit may be demodulated.

In the prior art, during demodulation processing, only an impact of Gaussian noise on a receive signal is considered in some demodulation methods without considering an impact of phase noise; however, with a modulation order adopted in the wireless communication system becoming increasingly higher, the density of constellation points increases, and an impact of the phase noise on the demodulation is increasingly remarkable, and if the phase noise is not considered, it may lead to a wrong demodulation result. Alternatively, although both the Gaussian noise and the phase noise are considered in some demodulation methods, the existing demodulation algorithm has a low anti-phase-noise capability, and when the phase noise is large, the impact of the phase noise on a demodulation result is still remarkable.

SUMMARY

Embodiments of the present invention provide a signal demodulation method and device, so as to improve an anti-phase-noise capability of a demodulation algorithm.

In a first aspect, an embodiment of the present invention provides a signal demodulation method, which includes:

obtaining a receive signal and a symbol probability parameter of the receive signal, where the symbol probability parameter includes: an amplitude $r_y$ and a phase angle $\phi_y$ of the receive signal, an amplitude $r_{x_j}$ and a phase angle $\phi_{x_j}$ of each constellation point $x_j$ in a decision constellation point set, and a standard deviation $\sigma_n$ of Gaussian noise and a standard deviation $\sigma_\theta$ of phase noise, where the decision constellation point set is located in a modulation constellation graph required for performing signal demodulation;

calculating, according to the symbol probability parameter, a symbol probability that a transmit signal corresponding to the receive signal is each constellation point $x_j$ in the decision constellation point set; and performing demodulation according to the symbol probability, and outputting demodulation information, where the demodulation information corresponds to a data bit corresponding to the transmit signal.

In another aspect, an embodiment of the present invention provides a signal demodulation device, which includes:

a parameter obtaining unit, configured to obtain a receive signal and a symbol probability parameter of the receive signal, where the symbol probability parameter includes:

an amplitude $r_y$ and a phase angle $\phi_y$ of the receive signal, an amplitude $r_{x_j}$ and a phase angle $\phi_{x_j}$ of each constellation point $x_j$ in a decision constellation point set, and a standard deviation $\sigma_n$ of Gaussian noise and a standard deviation $\sigma_\theta$ of phase noise, where the decision constellation point set is located in a modulation constellation graph required for performing signal demodulation;

a probability calculation unit, configured to calculate, according to the symbol probability parameter, a symbol probability that a transmit signal corresponding to the receive signal is each constellation point $x_j$ in the decision constellation point set; and a demodulation processing unit, configured to perform demodulation according to the symbol probability, and output demodulation information, where the demodulation information corresponds to a data bit corresponding to the transmit signal.

According to the signal demodulation method and device that are provided by the embodiments of the present invention, the symbol probability is calculated by adopting a simplified posterior probability in a situation where both the phase noise and the Gaussian white noise exist, and the demodulation is performed according to the symbol probability, so as to improve the anti-phase-noise capability.

DESCRIPTION OF EMBODIMENTS

An application environment of a signal demodulation method and device in embodiments of the present invention is first described: The signal demodulation method in the embodiments of the present invention is applied to a communication system such as a digital point-to-point microwave, millimeter wave, and E-band transmission system, a mobile cellular communication system, a wireless local area network system, a wireless metropolitan area network system, a wireless personal area network system, or the like, and is mainly used in a receiver in the communication system for processing a receive signal.

Figure 1:
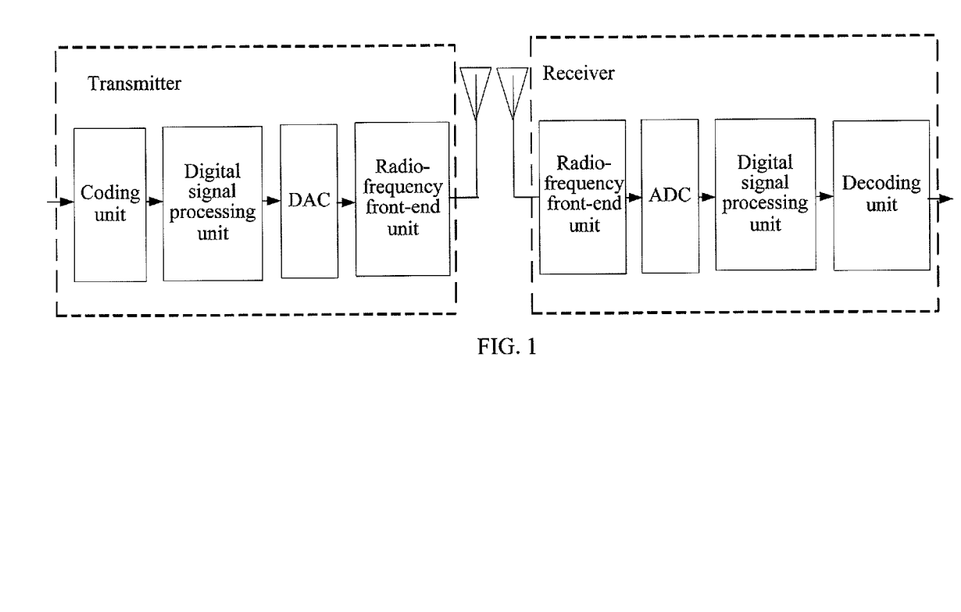
FIG. 1 is a schematic diagram of a system to which a signal demodulation method is applied according to an embodiment of the present invention.
Figure 2:
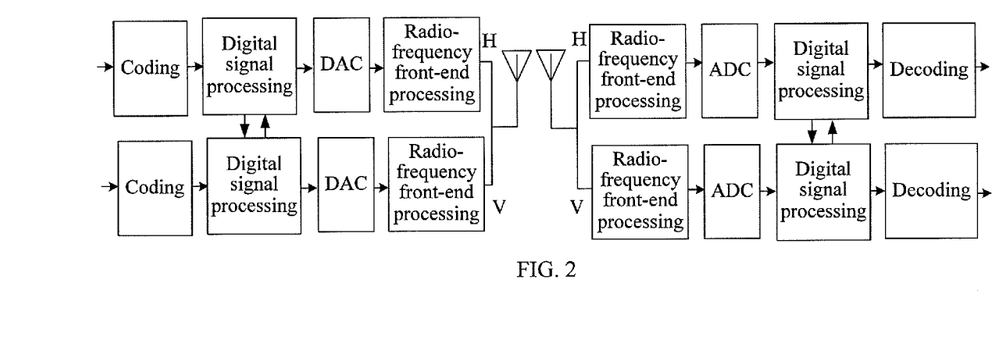
FIG. 2 is a schematic structural diagram of a dual polarization multiplexing system applied by a signal demodulation method according to an embodiment of the present invention.
Figure 3:
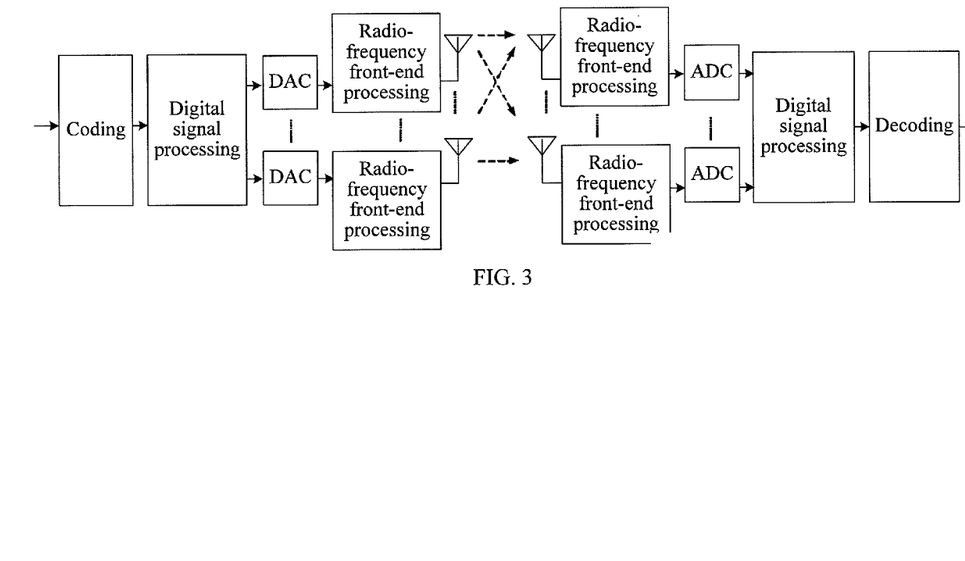
FIG. 3 is a schematic structural diagram of a MIMO system applied by a signal demodulation method according to an embodiment of the present invention.
Figure 4:
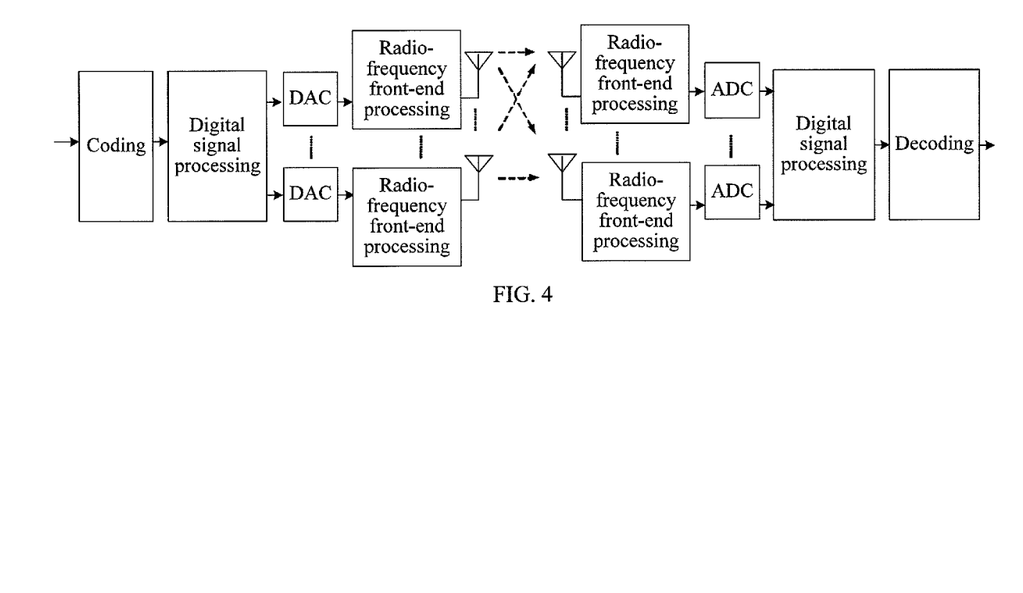
FIG. 4 is a schematic structural diagram of a system of dual polarization multiplexing in combination with MIMO that is applied by a signal demodulation method according to an embodiment of the present invention.

For an optional application structure, reference is made to FIG. 1. FIG. 1 is a schematic diagram of a system to which a signal demodulation method is applied according to an embodiment of the present invention. A coding unit of a transmitter codes a signal to be transmitted, to form an information sequence, a digital signal processing unit performs signal modulation, that is, converts the information sequence into a signal suitable for being transmitted in a channel, and then a digital-to-analog converter (Digital Analog Converter, DAC for short) performs digital-to-analog conversion on the signal and later, it is transmitted by a radio-frequency front-end unit, where the transmitted signal may be called a transmit signal. A signal received by a radio-frequency front-end unit of a receiver and transmitted through a channel may be called a receive signal, an analog-to-digital converter (Anology Digital Converter, ADC for short) performs analog-to-digital conversion on the receive signal, and then, the digital signal processing unit performs demodulation, that is, recovers a distorted digital signal affected by noise in channel transmission and obtains an information sequence for a decoding unit to perform error detection or error correction. A digital signal processing unit of the receiver adopts the signal demodulation method provided by the embodiment of the present invention. The signal demodulation method in the embodiment of the present invention may be further applied to any system in which phase noise exists, such as a system using dual polarization multiplexing and cross polarization interference cancellation (Cross Polarization Interference Cancellation, XPIC for short) technologies, a multiple-input multiple-output antenna (Multiple Input Multiple Output, MIMO for short) system, and a system of dual polarization multiplexing in combination with multiple-input multiple-output MIMO. For each system, reference may be respectively made to FIG. 2, FIG. 3, and FIG. 4. FIG. 2 is a schematic structural diagram of a dual polarization multiplexing system applied by a signal demodulation method according to an embodiment of the present invention. FIG. 3 is a schematic structural diagram of a MIMO system applied by a signal demodulation method according to an embodiment of the present invention. FIG. 4 is a schematic structural diagram of a system of dual polarization multiplexing in combination with MIMO that is applied by a signal demodulation method according to an embodiment of the present invention.

The signal demodulation method and device in the embodiments of the present invention are illustrated in detail in the following.

Embodiment 1

Several concepts involved in this embodiment are first illustrated in the following: A transmit signal refers to, for example, a signal generated by a digital signal processing unit of the transmitter in FIG. 1, a receive signal refers to, for example, a signal received by the digital signal processing unit of the receiver in the FIG. 1, and a decision constellation point set refers to a set of multiple constellation points that need to participate in calculation and are selected from a modulation constellation graph referred to by the receiver during demodulation. A signal demodulation method in this embodiment is used to identify a constellation point corresponding to a receive signal from the decision constellation point set. After the corresponding constellation point is identified, a data bit corresponding to the constellation point may be obtained according to a "constellation point-data bit mapping table", where the data bit is a data bit corresponding to a received signal, so as to complete demodulation on the receive signal. A person skilled in the art may understand that, during soft decision (illustrated subsequently), soft information is demodulated and output instead of a data bit, and the corresponding data bit may be obtained subsequently according to the soft information.

Figure 5:
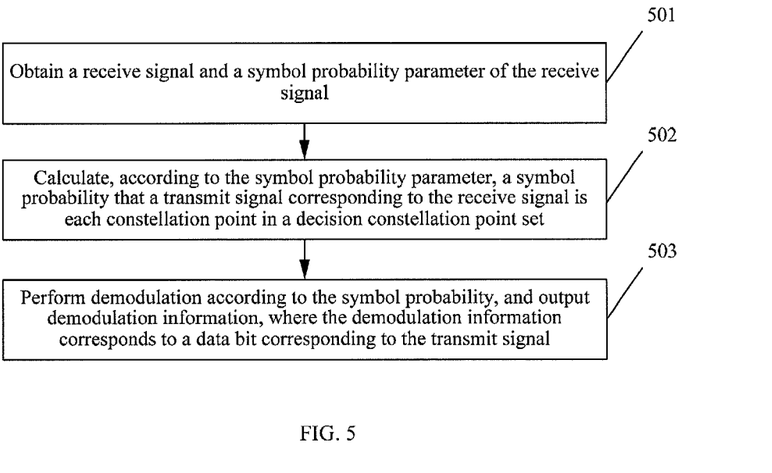
FIG. 5 is a schematic flowchart of an embodiment of a signal demodulation method according to the present invention.

FIG. 5 is a schematic flowchart of an embodiment of a signal demodulation method according to the present invention, and as shown in FIG. 5, the signal demodulation method in this embodiment includes:

Obtain a receive signal and a symbol probability parameter of the receive signal.

The receive signal is the signal received by the radio-frequency front-end unit of the receiver and transmitted through a channel, the symbol probability parameter is a parameter used when a symbol probability is calculated in 502, and may include: an amplitude $r_y$ and a phase angle $\phi_y$ of the receive signal, an amplitude $r_{x_j}$ and a phase angle $\phi_{x_j}$ of each constellation point $x_j$ in a decision constellation point set, and a standard deviation $\sigma_n$ of Gaussian noise and a standard deviation $\sigma_\theta$ of phase noise, where the decision constellation point set is located in a modulation constellation graph required for signal demodulation.

502: Calculate, according to the symbol probability parameter, a symbol probability that a transmit signal corresponding to the receive signal is each constellation point in the decision constellation point set.

The transmit signal corresponding to the receive signal refers to a signal transmitted by a radio-frequency front-end unit of the transmitter, and the transmit signal is transmitted through a channel and then received by the radio-frequency front-end unit of the receiver, and at this time, it is called a receive signal.

In this embodiment, calculation may be performed according to the following formula (1):

$$Pr(x = x_j / y) = \frac{r_y}{4\pi\sigma_n} \exp\left(-\frac{(r_y - r_{x_j})^2}{2\sigma_n^2} - \frac{r_{x_j} r_y (\varphi_y - \varphi_{x_j})^2}{2v_j}\right) / \sqrt{v_j} \quad (1)$$

In the foregoing formula (1), the obtained symbol probability is a posterior probability of each constellation point in the decision constellation point set. In the signal demodulation method in this embodiment, impacts of both the Gaussian noise and the phase noise on a signal are considered, and in the signal demodulation, an anti-interference capability for phase noise is improved to a great extent, leading to a better anti-interference capability when the phase noise is large.

503: Perform demodulation according to the symbol probability, and output demodulation information, where the demodulation information corresponds to a data bit corresponding to the transmit signal.

In this step, that the demodulation is performed according to the symbol probability refers to that hard decision demodulation or soft decision demodulation (these two demodulation manners are later illustrated in detail) may be continuously performed according to the symbol probability of each constellation point $x^j$ in the decision constellation point set that is obtained through formula (1), and the demodulation information obtained after decision is output to a decoding unit. That the demodulation information corresponds to the data bit corresponding to the transmit signal may include two situations: one situation is that, during the hard decision demodulation, the demodulation information is the data bit corresponding to the transmit signal, that is, the data bit is directly output; and another situation is that, during the soft decision demodulation, the demodulation information is soft information used to generate the data bit corresponding to the transmit signal.

A calculation formula for the hard decision demodulation or the soft decision demodulation is also based on the symbol probability formula (1), that is, converted from the symbol probability formula. In addition, the symbol probability formula is a simplified formula. Therefore, correspondingly, complexity in calculation during the hard decision demodulation or the soft decision demodulation inevitably decreases to a great extent with respect to the calculation complexity in calculation in the prior art.

Figure 6:
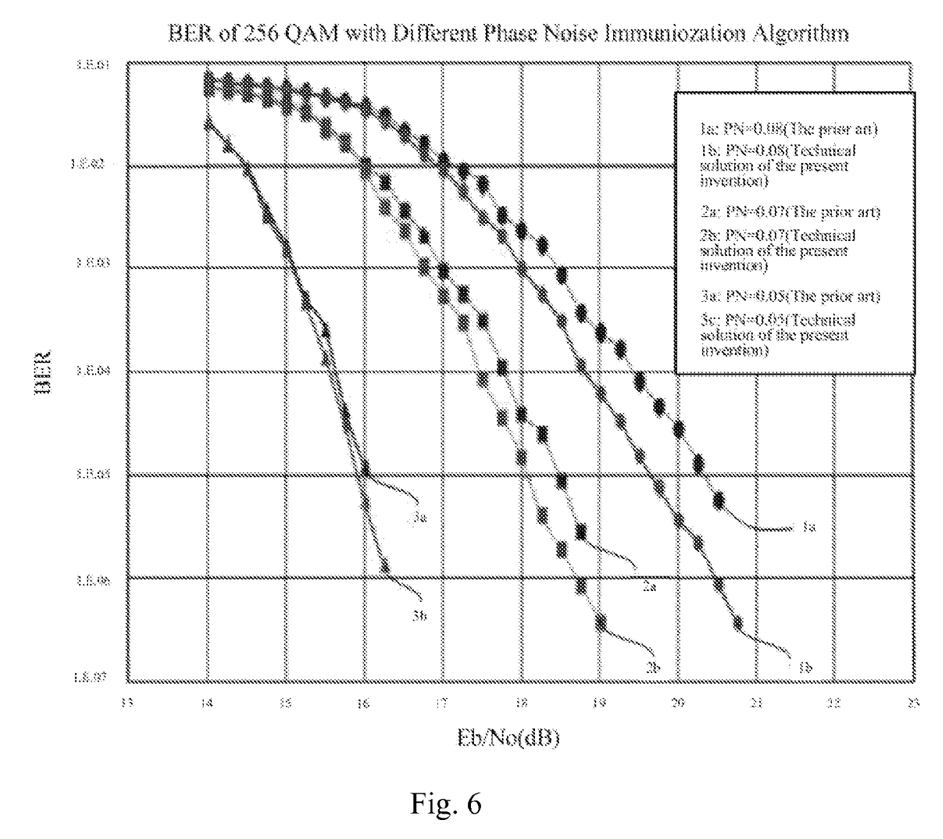
FIG. 6 is a schematic diagram of an experimental chart of an embodiment of a signal demodulation method according to the present invention.

Referring to FIG. 6, FIG. 6 is a schematic diagram of an experimental chart of an embodiment of a signal demodulation method according to the present invention. It can be obviously seen that, in the signal demodulation method in this embodiment, the calculation complexity is decreased, the calculation efficiency is increased, and the anti-phase-noise capability is remarkably improved when compared with a signal demodulation method in which both the Gaussian noise and the phase noise are considered in the prior art, so that the receiver is capable of rapidly demodulating a high-quality signal. As shown in FIG. 6, that PN=0.08 represents that a variance of the phase noise is 0.08, and under the same phase noise strength, a curve that is more to the left indicates better performance.

The hard decision demodulation and the soft decision demodulation are respectively illustrated in the following: A demodulation manner may be classified into the hard decision demodulation and the soft decision demodulation according to different output demodulation information.

During the hard decision demodulation, a constellation point corresponding to the transmit signal (here, the transmit signal is a transmit symbol commonly called in the art, which is called a transmit signal in the embodiment of the present invention) is directly determined according to the symbol probability, and the data bit corresponding to the constellation point is obtained, that is, during the hard decision demodulation, the output demodulation information is a data bit, so as to send the data bit to a decoder.

In the soft decision demodulation, the data bit is not obtained, the symbol probability is converted into soft information (which is equivalent to a code element decision with a confidence level) in another form, and the soft information is sent to the decoder, and the decoder obtains the data bit by using the soft information, that is, the soft information is output in the soft decision demodulation. For example, common soft information has a symbol probability form, a bit probability form, a likelihood ratio form, and a log-likelihood ratio form, and they can be mutually converted. In the following embodiments of the present invention, the soft information in the log-likelihood ratio form is taken as an example, which is not limited herein, and a conversion between different forms may be performed as required during specific implementation.

Specifically, if the demodulation manner adopted in 503 in this embodiment is the hard decision demodulation, processing is performed according to the following formula (2):

$$\hat{x} = \underset{x_j \in X}{\operatorname{argmax}} \{Pr(x = x_j/y)\} \quad (2)$$

$$= \underset{x_j \in X}{\operatorname{argmax}} \left\{ \frac{r_y}{4\pi\sigma_n} \exp\left(-\frac{(r_y - r_{x_j})^2}{2\sigma_n^2} - \frac{r_{x_j} r_y (\varphi_y - \varphi_{x_j})^2}{2v_j}\right) / \sqrt{v_j} \right\}$$

where the $\hat{x}$ represents a transmit signal, and the transmit signal is a certain constellation point in a modulation constellation graph of the receiver and is a constellation point that corresponds to a transmit signal of the transmitter and is determined from the decision constellation point set according to the formula (2); the X in the $x_j \in X$ is equivalent to the decision constellation point set, and all constellation points in the set are selected to participate in calculation according to the foregoing formula (2) and the constellation point corresponding to the transmit signal is determined from all constellation points in the set; and in this embodiment, that a set of all constellation points in the constellation graph is used as the decision constellation point set is taken as an example; and for meanings of other symbols in the formula (2), reference may be made to the description of the formula (1).

That is to say, during the hard decision demodulation, a constellation point having a maximum posterior probability is selected, according to the calculated posterior probability (that is, the symbol probability obtained in formula (1)) of each constellation point in the decision constellation point set, as the constellation point corresponding to the transmit signal. Then, the data bit corresponding to the constellation point is further obtained according to a pre-stored "constellation point-data bit mapping table", the data bit is the data bit corresponding to the transmit signal, and the data bit is used as the demodulation information output in the hard decision demodulation.

Specifically, if the demodulation manner adopted in 503 in this embodiment is the soft decision demodulation, processing is performed according to the following formula, and in this embodiment, that soft information in the log-likelihood ratio form of each bit in the data bit is solved is taken as an example, and a modulation mode of that $M=2^L$ is taken as an example, where the L is the total number of bits in the data bit, and the M is the number of constellation points in the modulation constellation graph. The following formula (3) represents a conversion process from a symbol probability to a bit probability, and a probability that each bit is 0 and a probability that each bit is 1 (the data bit obtained through demodulation actually is a string of binary information sequence, and in this embodiment, a binary system is taken as an example) respectively are that:

$$p(b_k = a|y) = \sum_{j=0}^{M-1} I(b_k = a|x_j) p(x_j|y), \quad (3)$$

-continued $(a = 0, 1; k = 0, 1, \ldots, L-1)$ where, $$I(b_k = a \mid x_j) = \begin{cases} 1 & \text{the } k_{th} \text{ bit } b_k \text{ corresponding} \\ & \text{to symbol } x_j = a \\ 0 & \text{the } k_{th} \text{ bit } b_k \text{ corresponding} \\ & \text{to symbol } x_j \neq a \end{cases}$$

The foregoing formula represents that a maximum posterior probability (that is, the symbol probability obtained through the formula (1)) of constellation points enabling the bit to be 0 in the decision constellation point set is selected as the probability that the bit is 0, and a maximum posterior probability of constellation points enabling the bit to be 1 in the decision constellation point set is selected as the probability that the bit is 1.

Therefore, log-likelihood ratio information of each bit is obtained as follows:

$$LLR(b_k) = \ln\left(\frac{p(b_k = 0 \mid y)}{p(b_k = 1 \mid y)}\right) \quad (4)$$

$$= \ln\left(\frac{\sum_{j=0}^{M-1} I(b_k = 0 \mid x_j)\exp\left(-\frac{(r_y - r_{x_j})^2}{2\sigma_n^2} - \frac{r_{x_j} r_y(\varphi_y - \varphi_{x_j})^2}{2v_j}\right) / \sqrt{v_j}}{\sum_{j=0}^{M-1} I(b_k = 1 \mid x_j)\exp\left(-\frac{(r_y - r_{x_j})^2}{2\sigma_n^2} - \frac{r_{x_j} r_y(\varphi_y - \varphi_{x_j})^2}{2v_j}\right) / \sqrt{v_j}}\right)$$

where the $b_k$ represents a certain bit, and the LLR $(b_k)$ represents a log-likelihood ratio of the bit; in formula (4), calculation of a numerator and a denominator is in a form of the sum of multiple exponents, and the calculation in which an exponent participates increases the implementation complexity to a great extent; therefore, in practical use, only a maximum value of terms in a summation operation may be used, and at this time, a log-likelihood ratio of each bit may be simplified as follows:

$$LLR(b_k) \approx \frac{1}{2}\left(-\frac{(r_y - r_{x_{j_0}})^2}{\sigma_n^2} - \frac{r_{x_{j_0}} r_y(\varphi_y - \varphi_{x_{j_0}})^2}{v_{j_0}} - \ln(v_{j_0})\right) - \quad (5)$$

$$\frac{1}{2}\left(-\frac{(r_y - r_{x_{j_1}})^2}{\sigma_n^2} - \frac{r_{x_{j_1}} r_y(\varphi_y - \varphi_{x_{j_1}})^2}{v_{j_1}} - \ln(v_{j_1})\right)$$

where $$x_{j_a} = \operatorname*{argmax}_{j=0,1,\ldots,M-1} \quad (6)$$

$$\left\{I(b_k = a \mid x_j)\exp\left(-\frac{(r_y - r_{x_j})^2}{2\sigma_n^2} - \frac{r_{x_j} r_y(\varphi_y - \varphi_{x_j})^2}{2v_j}\right) / \sqrt{v_j}\right\},$$

$(a = 0, 1)$

Therefore, the log-likelihood ratio information of the bit is obtained in the soft decision demodulation, and if the "likelihood ratio" is obtained in the soft decision demodulation, an ln operation is removed from the formula (4). The information is output to the decoder as the soft information, and the decoder performs subsequent processing. That is to say, during the soft decision demodulation, the probability that each bit in the data bit is 0 or 1 is calculated, and the log-likelihood ratio of the bit is obtained according to the probability that the bit is 0 or 1. Specifically, a maximum symbol probability of constellation points enabling the bit to be 0 in the decision constellation point set is determined as the probability that the bit is 0, and a maximum symbol probability of constellation points enabling the bit to be 1 in the decision constellation point set is determined as the probability that the bit is 1. For example, the constellation points enabling the bit to be 0 may be obtained through querying according to the constellation point-data bit mapping table.

For example, it is assumed that, according to a certain modulation mode, a data bit corresponding to each constellation point in the modulation constellation graph of the receiver has three bits, for example, a data bit corresponding to a constellation point A is "001", a data bit corresponding to a constellation point B is "100", a data bit corresponding to a constellation point C is "010", and so on, and then in the hard decision demodulation, the constellation point corresponding to the transmit signal is directly determined to be the constellation point B, and the data bit "100" corresponding to the constellation point B is obtained and output as the demodulation information, while in the soft decision demodulation, in a situation where that a final data bit has three bits is known, a log-likelihood ratio of a first bit, a log-likelihood ratio of a second bit, and a log-likelihood ratio of a third bit are respectively calculated, and subsequently, the decoder determines the data bit according to log-likelihood ratio information of each bit. Specifically, for example, for the first bit, it can be known by querying the mapping table that, the constellation points enabling the bit to be 0 are the constellation point A and the constellation point C, and then a maximum symbol probability of the two constellation points is selected as a probability that the first bit is 0, for example, a symbol probability of the constellation point A is p1, a symbol probability of the constellation point C is p2, and p1>p2, and then p1 is determined as the probability that the first bit is 0, and calculation principles of other bit probabilities are similar.

It should be noted that, although in the foregoing soft decision demodulation calculation in this embodiment, the modulation mode of that M=$2^L$ is taken as an example, the foregoing formulas also may be adopted in other modulation modes, the method is similar and details are not elaborated herein again. In addition, in this embodiment, that the soft information is the log-likelihood ratio is taken as an example, and during specific implementation, the soft information may also be other forms, for example, a likelihood ratio, as long as a person skilled in the art may perform conversion between various forms.

In the signal demodulation method according to this embodiment, the symbol probability is calculated by adopting the simplified posterior probability, and the demodulation is performed according to the symbol probability, so as to improve the anti-phase-noise capability of a demodulation algorithm.

Embodiment 2

In Embodiment 1, that the set of all constellation points in the modulation constellation graph of the receiver is used as the decision constellation point set is taken as an example, and in this embodiment, in order to further decrease the complexity of a demodulation algorithm and decrease a calculation amount, only a part of the constellation points in the modulation constellation graph are selected to participate in the calculation, which can further improve the calculation efficiency.

Figure 7:
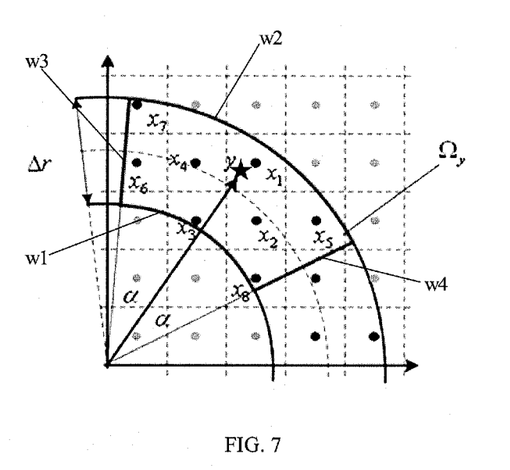
FIG. 7 is a schematic diagram of a fan-shaped decision area selected in another embodiment of a signal demodulation method according to the present invention.
Figure 8:
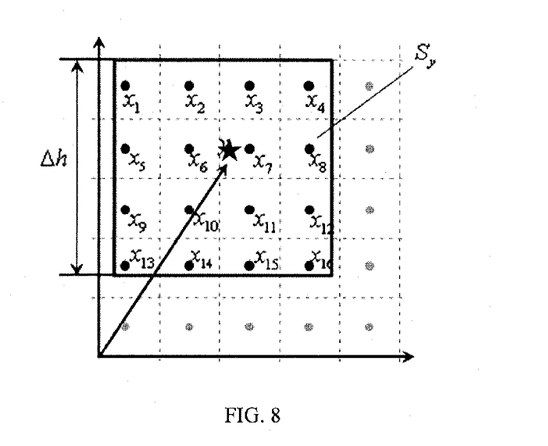
FIG. 8 is a schematic diagram of a square decision area selected in still another embodiment of a signal demodulation method according to the present invention.
Figure 9:
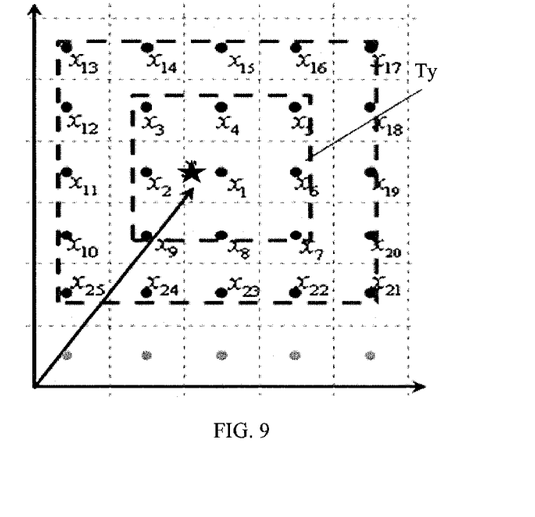
FIG. 9 is a schematic diagram of a square decision area selected in still another embodiment of a signal demodulation method according to the present invention.

In several examples in FIG. 7 to FIG. 9, that a fan-shaped area, a square area, or the like is selected is taken as an example for illustration; however, a person skilled in the art may understand that, during specific implementation, a shape of the area is not limited to the following shapes, for example, it may also use a circle, a diamond, or the like. When a shape of an area is determined, generally, distribution of the shape of area is close to noise may be considered, for example, the sector shown in FIG. 7, or based on the consideration of the calculation complexity, a constellation point in a regular shape near a receive signal may be selected, for example, squares shown in FIG. 8 and FIG. 9.

During specific implementation, before a symbol probability parameter is obtained, a decision area may be predetermined. A set of constellation points in the decision area is the decision constellation point set, a constellation point located in the decision area is a constellation point selected to participate in the calculation, the constellation points in the decision area are all constellation points or a part of constellation points in the constellation graph, and in this embodiment, a part of constellation points are taken as an example. Several methods for determining a decision area are illustrated in detail in the following:

FIG. 7 is a schematic diagram of a fan-shaped decision area selected in another embodiment of a signal demodulation method according to the present invention. As shown in FIG. 7, a receive signal y also has a corresponding amplitude and phase angle, and therefore it also corresponds to a location in a constellation graph. The corresponding location point of the y in the constellation graph is represented by a five-pointed star in FIG. 7, and it can be seen that, because of being affected by noise in a transmission process, the receive signal y does not coincide with a location of any constellation point in the constellation graph, and demodulation is to identify a constellation point to which the receive signal y should correspond.

In this embodiment, a fan-shaped area $\Omega_y$ near the receive signal y in FIG. 7 is selected as the decision area, and the fan-shaped area $\Omega_y$ may be determined according to the following method: in FIG. 6, $\Delta r = k_n \sigma_n$, and $\alpha = k_\theta \sigma_\theta$, where the $k_n$ and $k_\theta$ are adjustable parameters, and generally $$k_n \geq \frac{2d \times g}{\sigma_n} \text{ and } k_\theta \geq \frac{d \times g}{\sigma_\theta \times r_y},$$

where the g is a number slightly greater than 1, such as 1.01, the d is a minimum distance between constellation points, and the $\sigma_n$, d, $\sigma_\theta$, g, and $r_y$ are parameters that are known or predetermined; therefore, value ranges of the $k_n$ and $k_\theta$ can be obtained according to the foregoing formula.

The $k_n$ and $k_\theta$ may be determined in the value ranges of the $k_n$ and $k_\theta$ and may be determined according to the following principle: certain small values in the value ranges of the $k_n$ and $k_\theta$ are respectively used initially, if loss of performance is larger when compared with Embodiment 1, the values of the $k_n$ and $k_\theta$ are increased according to a certain step length (for example, 1) when complexity permits until the performance meets the requirement. Generally, the larger the values of the $k_n$ and $k_\theta$ are, the more constellation points exist in the fan-shaped area $\Omega_y$, and the larger the complexity becomes.

When the and $k_n$ and $k_\theta$ are determined, $\Delta r$ and $\alpha$ of the fan-shaped area may be determined according to this. For the $\Delta r$, an impact of Gaussian noise on a receive signal is considered, and an amplitude of the receive signal at a corresponding location point in the constellation graph is shifted to left and right, and specifically, it is shifted to left and right along a line between the location point and an original point of the constellation graph and centered the location point, and an arc w1 and an arc w2 are respectively obtained after the shift. For the $\alpha$, impacts of phase noise and the Gaussian noise on the receive signal are considered, a phase angle of the receive signal at the corresponding location point is shifted to left and right, respectively, and specifically, the line between the location point and the original point of the constellation graph moves to left and right by $\alpha$ around the original point of the constellation graph, and a line segment w3 and a line segment w4 are respectively obtained after the movement. As shown in FIG. 6, the w1, w2, w3, and w4 determine the fan-shaped area $\Omega_y$ together; and correspondingly, the decision constellation point set determined by the fan-shaped area $\Omega_y$ includes constellation points x1, x2, x3, and x8.

After the foregoing fan-shaped area is determined, demodulation calculation may be performed according to the method in Embodiment 1, for example, a hard decision demodulation formula obtained according to the fan-shaped area near the receive signal y is as follows:

$$\hat{x} = \arg\max_{x_j \in \Omega_y} \left\{ \frac{r_y}{4\pi\sigma_n} \exp\left(-\frac{(r_y - r_{x_j})^2}{2\sigma_n^2} - \frac{r_{x_j} r_y (\varphi_y - \varphi_{x_j})^2}{2v_j}\right) \Big/ \sqrt{v_j} \right\} \quad (7)$$

It can be seen that, in the foregoing formula, only the decision area is different when compared with the formula (2) in Embodiment 1. The decision area in the formula (2) is "$x_j \in X$" where the X refers to all constellation points in the constellation graph, while in the formula (7) in this embodiment, the decision area is "$x_j \in \Omega_y$", where the $\Omega_y$ is the foregoing determined fan-shaped area, and only has a part of the constellation points in the constellation graph. Similarly, in other formulas in the demodulation calculation, the decision area may also be changed, which is not elaborated subsequently again.

FIG. 8 is a schematic diagram of a square decision area selected in still another embodiment of a signal demodulation method according to the present invention. As shown in FIG. 8, similarly, a corresponding location point of the y in the constellation graph is represented by a five-pointed star. In this embodiment, the square decision area is a quadrate area centered the location point; therefore, as long as $\Delta h$ shown in FIG. 8 is determined, the square area Sy can be determined.

Specifically, the $\Delta h$ may be determined according to the following method: in the figure, $\Delta h = k_s \times g$, where the g is a number slightly greater than 1, for example, 1.01, the $k_s$ is an adjustable parameter, and generally, $k_s \geq 3$; and similarly, it is compromised in a value range thereof according to the performance and the complexity, so as to determine a numerical value meeting the requirement of a system.

Similarly, after the foregoing square area is determined, demodulation calculation may be performed according to the method in Embodiment 1, and only the decision area is changed. In this embodiment, constellation points that participate in the calculation and are determined in the square decision area Sy include x1 to x16 shown in FIG. 8.

FIG. 9 is a schematic diagram of a square decision area selected in still another embodiment of a signal demodulation method according to the present invention. As shown in FIG. 9, a constellation point closest to the location point (shown by a five-pointed star) where the receive signal y is located and constellation points of n layers that are around it are determined as the decision constellation point set, that is, a decision area Ty shown in FIG. 9.

As shown in FIG. 9, a constellation point closest to the location point is x1, and during specific implementation, the closest constellation point may be calculated according to a certain distance formula, and in this embodiment, constellation points of two layers that are around the x1 are selected. The n is an integer greater than or equal to 1, and generally, n=2, and similarly, it may be compromised in a value range thereof according to the performance and the complexity, so as to determine a numerical value meeting the requirement of a system.

In the signal demodulation method according to this embodiment, the symbol probability is calculated by adopting a simplified posterior probability, and the demodulation is performed according to the symbol probability, so as to decrease the complexity of the demodulation algorithm, improve the processing efficiency, and improve an anti-phase-noise capability; and the decision area including a part of constellation points is selected, so as to further decrease the calculation complexity and improve the calculation efficiency.

Embodiment 3

Figure 10:
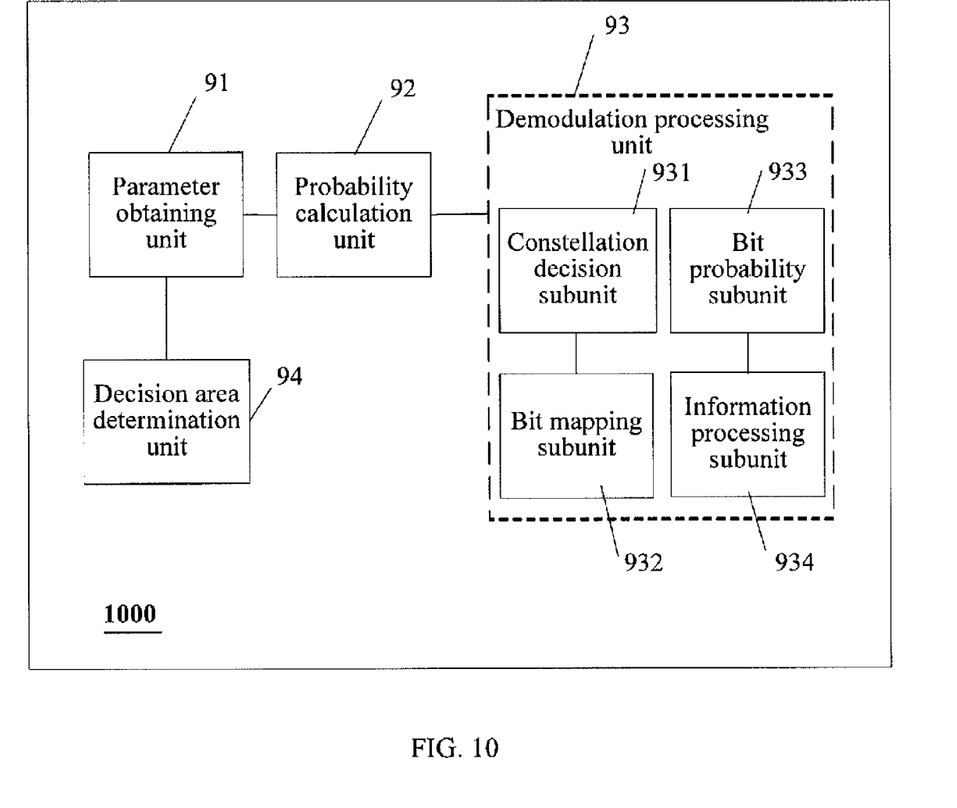
FIG. 10 is a schematic structural diagram of an embodiment of a signal demodulation device according to the present invention.

FIG. 10 is a schematic structural diagram of an embodiment of a signal demodulation device according to the present invention. The device can execute the signal demodulation method of any embodiment of the present invention, and the structure of the device is briefly described in this embodiment, and for a specific working principle thereof, reference may be made to the description of the method embodiment. As shown in FIG. 10, the device is a receiver in a communication system, and may include: a parameter obtaining unit 91, a probability calculation unit 92, and a demodulation processing unit 93.

The parameter obtaining unit 91 is configured to obtain a receive signal and a symbol probability parameter of the receive signal, where the symbol probability parameter includes: an amplitude $r_y$ and a phase angle $\phi_y$ of the receive signal, an amplitude $r_{x_j}$ and a phase angle $\phi_{x_j}$ of each constellation point $x_j$ in a decision constellation point set, and a standard deviation $\sigma_n$ of Gaussian noise and a standard deviation $\sigma_\theta$ of phase noise, where the decision constellation point set is located in a modulation constellation graph required for performing signal demodulation.

The probability calculation unit 92 is configured to calculate, according to the symbol probability parameter, a symbol probability that a transmit signal corresponding to the receive signal is each constellation point $x_j$ in the decision constellation point set, for example, may calculate the symbol probability according to the following formula:

$$Pr(x = x_j/y) = \frac{r_y}{4\pi\sigma_n}\exp\left(-\frac{(r_y - r_{x_j})^2}{2\sigma_n^2} - \frac{r_{x_j}r_y(\varphi_y - \varphi_{x_j})^2}{2v_j}\right)/\sqrt{v_j},$$

where the $v_j = r_{x_j}r_y\sigma_\theta^2 + \sigma_n^2$.

The demodulation processing unit 93 is configured to perform demodulation according to the symbol probability, and output demodulation information, where the demodulation information corresponds to a data bit corresponding to the transmit signal.

Optionally, when a hard decision demodulation manner is adopted, the demodulation processing unit 93 includes: a constellation decision subunit 931 and a bit mapping subunit 932. The constellation decision subunit 931 is configured to determine that a constellation point having a maximum symbol probability in the decision constellation point set is a constellation point corresponding to the transmit signal; and the bit mapping subunit 932 is configured to search for a data bit corresponding to the constellation point, where the data bit is the data bit corresponding to the transmit signal, and output the data bit as the demodulation information.

Optionally, when a soft decision demodulation manner is adopted, the demodulation processing unit is specifically configured to perform the demodulation according to the symbol probability, and output soft information used to generate the data bit corresponding to the transmit signal, where the soft information includes a symbol probability, a bit probability, a likelihood ratio, or a log-likelihood ratio, and the soft information is the demodulation information.

When the soft information is a likelihood ratio or a log-likelihood ratio, the demodulation processing unit 93 includes: a bit probability subunit 933 and an information processing subunit 934. The bit probability subunit 933 is configured to determine a maximum symbol probability of constellation points of which a bit to be calculated is 0 in the decision constellation point set as a probability that the bit to be calculated is 0, and determine a maximum symbol probability of constellation points of which a bit to be calculated is 1 in the decision constellation point set as a probability that the bit to be calculated is 1; and the information processing subunit 934 is configured to obtain, according to the probability that the bit to be calculated is 0 and the probability that the bit to be calculated is 1, a log-likelihood ratio of the bit to be calculated, and output the log-likelihood ratio as the demodulation information, where the bit to be calculated is a certain bit in a data bit corresponding to a constellation point in the decision constellation point set.

The foregoing constellation decision subunit 931 and bit mapping subunit 932 (which may be called a hard decision unit group), and the bit probability subunit 933 and information processing subunit 934 (which may be called a soft decision unit group) may exist in the signal demodulation device at the same time, or only one of the unit groups may exist, and in this embodiment, the two unit groups are only displayed in one figure.

Optionally, the signal demodulation device in this embodiment may further include: a decision area determination unit 94, configured to determine a decision area in the constellation graph after the symbol probability parameter is obtained, where a set of constellation points in the decision area is the decision constellation point set, and the constellation points in the decision area are a part of constellation points in the constellation graph.

A person skilled in the art may understand that, the signal demodulation device in this embodiment may be, for example, a digital signal processing unit of the receiver or a word unit of the digital signal processing unit, or another application structure. As long as signal demodulation is involved, the device in the embodiment of the present invention can be adopted.

The signal demodulation device according to this embodiment calculates the symbol probability by adopting a simplified posterior probability, and performs the demodulation according to the symbol probability, so as to decrease the complexity of a demodulation algorithm, improve the processing efficiency, and improve an anti-phase-noise capability.

A person of ordinary skill in the art may understand that all or a part of the steps in each of the foregoing method embodiments may be implemented by a program instructing relevant hardware. The aforementioned program may be stored in a computer readable storage medium. When the program runs, the steps of the forgoing methods in the embodiments are performed. The storage medium includes any medium that is capable of storing program codes, such as a ROM, a RAM, a magnetic disk, or an optical disk.

What is claimed is:

1. A signal demodulation method, comprising:
    obtaining, by a parameter obtaining unit, a receive signal;
    obtaining, by the parameter obtaining unit, a symbol probability parameter of the receive signal, wherein the symbol probability parameter comprises:
        amplitude $r_y$ and phase angle $\phi_y$ of the receive signal,
        amplitude $r_{x_j}$ and phase angle $\phi_{x_j}$ of each constellation point $x_j$ in a decision constellation point set, and
        a standard deviation $\sigma_n$ of Gaussian noise and a standard deviation $\sigma_\theta$ of phase noise, wherein the decision constellation point set is located in a modulation constellation graph for performing signal demodulation;
    calculating, by a probability calculation unit, according to the symbol probability parameter, a symbol probability that a transmit signal corresponding to the receive signal is each constellation point $x_j$ in the decision constellation point set, wherein the calculating the symbol probability that the transmit signal corresponding to the receive signal is each constellation point $x_j$ in the decision constellation point set comprises calculating:

$$Pr(x = x_j / y) = \frac{r_y}{4\pi\sigma_n} \exp\left(-\frac{(r_y - r_{x_j})^2}{2\sigma_n^2} - \frac{r_{x_j}r_y(\varphi_y - \varphi_{x_j})^2}{2v_j}\right) / \sqrt{v_j}$$

wherein the $v_j = r_{x_j}r_y\sigma_\theta^2 + \sigma_n^2$
    and the $Pr(x=x_j/y)$ is the symbol probability;
    performing, by a demodulation processing unit, demodulation according to the symbol probability, and outputting demodulation information, wherein the demodulation information corresponds to a data bit corresponding to the transmit signal.

2. The signal demodulation method according to claim 1, wherein the performing demodulation according to the symbol probability, and outputting demodulation information comprises:
    determining that a constellation point having a maximum symbol probability in the decision constellation point set is a constellation point corresponding to the transmit signal; and
    searching for a data bit corresponding to the constellation point, wherein the data bit is the data bit corresponding to the transmit signal, and outputting the data bit;
    wherein the demodulation information is the data bit corresponding to the transmit signal.

3. The signal demodulation method according to claim 1, wherein the performing demodulation according to the symbol probability, and outputting demodulation information comprises:
    performing the demodulation according to the symbol probability, and outputting soft information, wherein the soft information comprises a symbol probability, a bit probability, a likelihood ratio, or a log-likelihood ratio;
    wherein the demodulation information is soft information used to generate the data bit corresponding to the transmit signal.

4. The signal demodulation method according to claim 3, wherein the demodulation information is a likelihood ratio or a log-likelihood ratio, and the performing demodulation according to the symbol probability, and outputting demodulation information comprises:
    determining a maximum symbol probability of constellation points of which a bit to be calculated is 0 in the decision constellation point set as a probability that the bit to be calculated is 0;
    determining a maximum symbol probability of constellation points of which a bit to be calculated is 1 in the decision constellation point set as a probability that the bit to be calculated is 1; and
    obtaining, according to the probability that the bit to be calculated is 0 and the probability that the bit to be calculated is 1, a likelihood ratio or a log-likelihood ratio of the bit to be calculated, and outputting the likelihood ratio or the log-likelihood ratio as the demodulation information;
    wherein the bit to be calculated is a certain bit in a data bit corresponding to a constellation point in the decision constellation point set.

5. The signal demodulation method according to claim 1, wherein before the obtaining the symbol probability parameter, the method further comprising:
    determining a decision area in the modulation constellation graph, wherein a set of constellation points in the decision area is the decision constellation point set, and the constellation points in the decision area are a part of constellation points in the modulation constellation graph.

6. The signal demodulation method according to claim 5, wherein the determining the decision area in the constellation graph comprises:
    determining a fan-shaped area or a square area comprising a corresponding location point of the receive signal in the constellation graph as the decision area.

7. A signal demodulation device, comprising:
    a parameter obtaining unit, configured to obtain a receive signal and a symbol probability parameter of the receive signal, wherein the symbol probability parameter comprises:
        amplitude $r_y$ and phase angle $\phi_y$ of the receive signal,
        amplitude $r_{x_j}$ and phase angle $\phi_{x_j}$ of each constellation point $x_j$ in a decision constellation point set, and
        a standard deviation $\sigma_n$ of Gaussian noise and a standard deviation $\sigma_\theta$ of phase noise, wherein the decision constellation point set is located in a modulation constellation graph required for performing signal demodulation;
    a probability calculation unit, configured to calculate, according to the symbol probability parameter, a symbol probability that a transmit signal corresponding to the receive signal is each constellation point $x_j$ in the decision constellation point set, wherein the probability calculation unit is configured to calculate the symbol probability according to the following formula:

$$Pr(x = x_j/y) = \frac{r_y}{4\pi\sigma_n} \exp\left(-\frac{(r_y - r_{x_j})^2}{2\sigma_n^2} - \frac{r_{x_j}r_y(\varphi_y - \varphi_{x_j})^2}{2v_j}\right) / \sqrt{v_j}$$

wherein the $v_j = r_{x_j} r_y \sigma_\theta^2 + \sigma_n^2$,
and the $Pr(x=x_j/y)$ is the symbol probability; and
a demodulation processing unit, configured to perform demodulation according to the symbol probability, and output demodulation information, wherein the demodulation information corresponds to a data bit corresponding to the transmit signal.

8. The signal demodulation device according to claim 7, wherein the demodulation processing unit comprises:
a constellation decision subunit, configured to determine that a constellation point having a maximum symbol probability in the decision constellation point set is a constellation point corresponding to the transmit signal; and
a bit mapping subunit, configured to search for a data bit corresponding to the constellation point, wherein the data bit is the data bit corresponding to the transmit signal, and output the data bit, wherein the data bit is the demodulation information.

9. The signal demodulation device according to claim 7, wherein the demodulation processing unit is configured to perform the demodulation according to the symbol probability, and output soft information used to generate the data bit corresponding to the transmit signal,
wherein the soft information comprises a symbol probability, a bit probability, a likelihood ratio, or a log-likelihood ratio, and
wherein the soft information is the demodulation information.

10. The signal demodulation device according to claim 9, wherein the demodulation processing unit comprises:
a bit probability subunit, configured to determine a maximum symbol probability of constellation points of which a bit to be calculated is 0 in the decision constellation point set as a probability that the bit to be calculated is 0, and determine a maximum symbol probability of constellation points of which a bit to be calculated is 1 in the decision constellation point set as a probability that the bit to be calculated is 1; and
an information processing subunit, configured to obtain, according to the probability that the bit to be calculated is 0 and the probability that the bit to be calculated is 1, a likelihood ratio or a log-likelihood ratio of the bit to be calculated, and output the likelihood ratio or the log-likelihood ratio as the demodulation information, wherein the bit to be calculated is a certain bit in a data bit corresponding to a constellation point in the decision constellation point set.

11. The signal demodulation device according to claim 7, further comprising:
a decision area determination unit, configured to determine a decision area in the modulation constellation graph, wherein a set of constellation points in the decision area is the decision constellation point set, and the constellation points in the decision area are a part of constellation points in the modulation constellation graph.

\* \* \* \* \*